United States Patent [19]

Pujari et al.

[11] Patent Number: 5,525,557

[45] Date of Patent: Jun. 11, 1996

[54] HIGH DENSITY GREEN BODIES

[75] Inventors: Vimal K. Pujari, Northborough; Gulio Rossi, Shrewsbury, both of Mass.

[73] Assignee: Norton Company, Worcester, Mass.

[21] Appl. No.: 433,579

[22] Filed: May 3, 1995

Related U.S. Application Data

[62] Division of Ser. No. 323,970, Oct. 17, 1994, Pat. No. 5,466,400, which is a division of Ser. No. 197,040, Feb. 16, 1994, abandoned, which is a division of Ser. No. 1,367, Jan. 7, 1993, Pat. No. 5,312,571.

[51] Int. Cl.$^6$ .................................................. C04B 35/584
[52] U.S. Cl. ............................................. 501/97; 423/344
[58] Field of Search ........................... 501/97, 103, 12; 423/344, 608

[56] References Cited

U.S. PATENT DOCUMENTS

| | | | |
|---|---|---|---|
| 2,408,986 | 10/1946 | Marisic et al. | 252/259.3 |
| 3,329,745 | 7/1967 | La Grange | 264/0.5 |
| 3,397,257 | 8/1968 | Brambilla et al. | 264/0.5 |
| 3,737,500 | 6/1973 | Sarem | 264/142 |
| 3,763,603 | 10/1973 | Trischuk | 51/319 |
| 3,860,691 | 1/1975 | Gens | 423/254 |
| 3,904,736 | 9/1975 | Triggiani | 423/251 |
| 3,978,269 | 8/1976 | Martin | 428/403 |
| 4,035,450 | 7/1977 | Langen et al. | 261/76 |
| 4,116,882 | 9/1978 | Bendig et al. | 252/448 |
| 4,407,967 | 10/1983 | Luks | 501/81 |
| 4,433,068 | 2/1984 | Long et al. | 521/54 |
| 4,441,905 | 4/1984 | Malmendier et al. | 65/21.3 |
| 4,621,936 | 11/1986 | Hansson et al. | 401/215 |
| 4,640,807 | 2/1987 | Afghan et al. | 264/13 |
| 4,719,091 | 1/1988 | Wusirika | 423/608 X |
| 4,734,237 | 3/1988 | Fanelli et al. | 264/122 |
| 4,830,993 | 5/1989 | Legrand et al. | 423/608 X |
| 4,865,829 | 9/1989 | Hattori et al. | 423/338 |
| 4,879,080 | 11/1989 | Hsieh | 501/97 X |
| 4,917,857 | 4/1990 | Jaeckel et al. | 419/9 |
| 4,931,414 | 6/1990 | Wood et al. | 423/608 X |
| 4,994,107 | 2/1991 | Flagan et al. | 75/367 |
| 4,999,182 | 3/1991 | Baumard et al. | 423/608 |
| 5,030,391 | 7/1991 | Sumita et al. | 264/5 |
| 5,064,783 | 11/1991 | Luckevich | 501/12 |
| 5,071,635 | 12/1991 | Yamanaka et al. | 423/592 |
| 5,077,241 | 12/1991 | Moh et al. | 501/84 |
| 5,122,360 | 6/1992 | Harris et al. | 423/608 X |
| 5,236,684 | 8/1993 | Krause | 423/344 |
| 5,275,985 | 1/1994 | Huang | 501/97 |
| 5,378,666 | 1/1995 | Bachelard et al. | 423/344 X |
| 5,389,586 | 2/1995 | Rogers et al. | 501/97 X |

FOREIGN PATENT DOCUMENTS

| | | | |
|---|---|---|---|
| 434165A1 | 6/1991 | European Pat. Off. | C01B 21/072 |
| 61-14905 | 1/1986 | Japan . | |

OTHER PUBLICATIONS

Robert B. Matthews and M. Lorne Swanson, "Fabrication of Large (Th,U)O$_2$ Microspheres", vol. 58, No. 2 (1979) pp. 223–227, Ceramic Bulletin.

*Primary Examiner*—Karl Group
*Attorney, Agent, or Firm*—Thomas M. DiMauro

[57] ABSTRACT

This invention relates a high density green bodies, particularly high density silicon nitride spherical green bodies having substantially no radial density gradients.

8 Claims, No Drawings

HIGH DENSITY GREEN BODIES

The present invention is a divisional application relating from U.S. Ser. No. 08/323,970, filed Oct. 17, 1994, now U.S. Pat. No. 5,466,400, which is a divisional of U.S. Ser. No. 08/197,040, filed Feb. 16, 1994, now abandoned, which is a divisional relating from U.S. Ser. No. 08/001,367, filed Jan. 7, 1993 and issuing as U.S. Pat. No. 5,312,571 on May 17, 1994.

BACKGROUND OF THE INVENTION

Ceramic materials have gained the attention of industry by virtue of their low cost and superior performance qualities. These qualities, such as superior high temperature strength, high toughness, resistance to thermal shock, and resistance to oxidation provide the bases for their potential use in a variety of applications.

Although complex-shaped ceramics have been considered in many applications, spherical ceramics appear to be especially promising. For example, silicon nitride is presently widely used in ball bearings. These bearings can be used without lubrication and so provide an advantage over conventional metal bearings which require lubrication. Further, silicon nitride is also a candidate milling medium for ball-milling operations. Because ball-milling is a high-wear application, the toughness and hardness of silicon nitride make it highly desirable for this use.

The production of a ceramic ball bearing or milling ball requires the formation of an unsintered, moderately dense, spherical, green body which can then be sintered into a hard, dense ceramic-ball. However, conventional methods of forming green bodies appear to have limitations which render them unsuitable for forming the desired spherical bodies. For example, slip casting appears to be impractical for the large scale production of a simple shape. Uniaxial die pressing has been used to produce ceramic balls having very good dimensional control. However, this process requires the use of an expensive die press, and produces a ceramic ball having undesirable gradients within the green body and an undesirable mold flashing, or lip, upon the surface of the green body. This lip must be removed from the green body in order to meet tolerance requirements and is often machined off in a tumbler. Injection molding processes offer an alternative method of making the green sphere. However, it requires expensive molds and a long dewaxing process to remove the binder prior to sintering. Various granulation methods also produce spherical balls by the snow-bailing approach, wherein a seed is rolled in a powder. However, substantial radial gradients are observed and dimensional control by this method is less than desirable.

Because the conventional methods of forming green bodies have proven unsatisfactory for producing spherical shapes, the art has focused on alternative methods of making such spheres. For example, European Patent Publication No. 434,164 (Contursi) teaches forming a mixture comprising a ceramic powder precursor, carbon and a carbohydrate, dropping the mixture into an alkaline solution thus converting it to a sol, and nitriding the spherical sols to form a powder. The process does not produce spherical green bodies and requires a time-consuming chemical reaction between its strongly alkaline solution (7M $NH_4OH$) and its mixture in order to form its sol.

U.S. Pat. No. 4,441,905 (Malmendier) describes a method of making spherical bodies comprising: a) releasing gel droplets containing crystals of synthetic mica into a liquid having a surface tension that tends to spheroidize the droplets, b) solidifying the bodies via cation exchange within an ion exchange medium; and, c) separating the bodies from the liquid medium. Although Malmender's method of gel solidification does produce spheroids, it also requires the use of crystals of synthetic mica and ion exchange, and so is a complicated process of narrow applicability.

U.S. Pat. No. 4,865,829 (Hattori) describes a) suspending a silicic acid ester/water mixture in a medium comprising ethyl cellulose and an organic liquid which is immiscible in the mixture, b) hydrolyzing and polymerizing the mixture to produce a spheroid gel particle dispersion slurry, c) separating the gel particles from the dispersing medium, and d) drying the spheres. However, not only are undesirably long reaction times and high temperatures needed to polymerize the ester, the method appears to be restricted to production of relatively porous, silica green bodies.

U.S. Pat. No. 5,030,391 (Sumita) describes a method of making spherical bodies comprising (i) pouring a ceramic/water mixture into an organic liquid to form a water-in-oil slurry, (ii) pouring the water-in-oil slurry into water to form a water-in-oil-in-water ("w/o/w") slurry having a polymer-coated ceramic phase, (iii) heating the polymer to form a solid polymer shell and a ceramic core (iv) separating the shell and core from the aqueous solution, and (v) removing the shell by thermal decomposition. Clearly, this method is quite complicated, requiring a w/o/w slurry formation step and two heating steps to obtain a porous ceramic green body.

U.S. Pat. No. 4,734,237 (Fanelli et al.) teaches a method of forming green bodies comprising the steps of: (i) mixing a ceramic powder and an agaroid gel-forming material into a solvent in which the agaroid is soluble, (ii) supplying the mixture into a mold, and (iii) forming a molded green body by lowering the temperature of the mixture to a point below the gel-forming temperature of the agaroid material. Although the Fanelli et al. process overcomes some of the shortcomings of the above-mentioned gel-forming art, it does not teach producing spheroid green bodies. Further, the green bodies it does produce have low densities which are extremely susceptible to deformation during handling and, when sintered, yield ceramic bodies having theoretical densities of only about 80%. Matthews and Simpson, Ceramic Bulletin, Vol. 58, No. 2, pp. 223–227 (1979), disclose dropping ceramic precursor sols into a column of 2-ethyl hexanol to form a sphere. Water is slowly extracted from the sol by the 2-ethyl hexanol, and the sol transforms chemically into a gel. As the gelled sphere densifies, it drops out of the column. However, not only is this method limited to having sols as starting materials, but also the chemical transformation of the sol to a gel requires a long reaction time.

Thus, it is the object of the present invention to provide an improved method of making green bodies from various metal and ceramic powders which overcomes shortcomings of the prior art.

SUMMARY OF THE INVENTION

In accordance with the present invention, there is provided a method of making shaped, gelled bodies, comprising:

(1) producing a mixture comprising a first liquid, a granular substance or a precursor thereof, and a gelation compound which gels at a gelation temperature, and (2) introducing portions of the mixture into a first fluid in which the first liquid is immiscible, said first fluid having a temperature of about the gelation temperature, thereby causing the portions to take on a shape and then gel to form shaped, gelled bodies.

In preferred embodiments of the present invention, there is further provided the step of:

(3) washing the shaped, gelled bodies in a second fluid which can extract the first liquid from the shaped, gelled bodies and densify the shaped, gelled bodies.

DETAILED DESCRIPTION OF THE INVENTION

The mixture of the present invention can be any combination of compounds having a first liquid, a granular substance or precursor thereof, and a gelation compound which gels at a gelation temperature. Typical mixtures include suspensions, slurries, dispersions and solutions. In preferred embodiments, the mixture is a slurry.

The first liquid of the present invention can be any liquid which is essentially unreactive toward the powder and can solubilize the gelation compound. In preferred embodiments of the present invention, the first liquid is polar and, more preferably, is water. However, mixtures of water with other liquids can be used (e.g., alcohols, acetone, etc.) as the first liquid, provided that the gelation compound of the present invention is soluble in such mixtures at temperatures above the gelation temperature.

The granular substance or precursor thereof can be any rigid body or precursor thereof. Preferably, it is a metal, ceramic or ceramic precursor material which is inert in the presence of the liquids of the present invention and which can be the primary material of a green body. In preferred embodiments, the granular substance or precursor thereof is a powder, preferably a ceramic powder. More preferably, the ceramic powder is silicon nitride. In typical embodiments of the present invention, the granular substance or precursor thereof is a powder, resulting in a solids loading of between about 20% and about 50% by volume of the mixture, preferably, about 25% by volume. In preferred embodiments, powders having a high packing density, i.e., in the range of about 58–60%, are used.

The gelation compound can be any material which is soluble in the first liquid and exhibits gelation within a narrow temperature range. Typically, the gelation compound gels within about 3 to about 10 seconds of contacting the second liquid, preferably within about 5 seconds. This compound gels at about the same time or after the portions tend to take on a shape, thus setting and binding the portions into discrete, shaped, gelled bodies. Preferred gelation compounds are those which are water soluble and comprise an agaroid. Most preferably, the gelation compound is agarose. The gelation compound usually gels at a temperature between about 0° C. and about 5° C., preferably about 0° C. Typically, the gelation compound is used in an amount between about 1% and about 5% by weight of the mixture, preferably, about 2% by weight.

The portions of the mixture introduced into the first fluid can be any shape, including, but not limited to, spheres, spheroids, droplets and filaments. In preferred embodiments, the portions are introduced as droplets and take on the shape of spheres.

The first fluid of the present invention can be any fluid which is essentially unreactive towards the slurry components and in which the first liquid is essentially immiscible. The immiscibility of the first liquid in the first fluid forces the mixture to take on a shape, preferably a sphere, when it is introduced, preferably drop-wise, into the first fluid. Typically, the temperature of the first fluid is lower than that of the mixture. In preferred embodiments of the present invention, the first fluid is a second liquid, preferably a non-polar liquid, and more preferably is a cold paraffin oil.

The second-fluid of the present invention is any fluid which can extract the first liquid from the shaped, gelled bodies. This extraction procedure provides an advantage over conventional water extraction procedures, such as slip casting, in that it can be performed with relative ease. It has been found that, in the making of ceramic bodies, this extraction process not only easily extracts the first liquid, but also produces a more dense green body which is more amenable to handling and capable of being fired to a higher final density. Typically, this procedure produce green bodies having densities of at least about 50%, preferably about 65%, and most preferably about 70% of theoretical density. Without wishing to be tied to a theory, it is believed that the capillary forces which pull the first liquid from the shaped, gelled bodies also act to densify the bodies. In preferred embodiments of the present invention, the second fluid is a third liquid, preferably a hygroscopic liquid. In more preferred embodiments, the second fluid is 2-ethylhexanol.

The shaped, gelled bodies can take on any shape, including but not limited to spheres, spheroids, droplets and filaments. In preferred embodiments, the shaped, gelled bodies are spheres.

In some applications of the present invention in which the mixture is a slurry, it was found that the slurry was prone to agglomeration, and subsequently sedimentation. Thus, it is desirable to adjust the pH of the slurry to a point above the isoelectric point of the powder, thereby promoting particle dispersion. Accordingly, in some embodiments of the present invention, a basic compound such as ammonium hydroxide is added to the slurry prior to its contact with the first fluid to adjust the slurry to a pH of about 9, thereby preventing agglomeration. It is believed that this weakly basic slurry does not experience appreciable chemical reaction between its gelation compound and its hydroxide ions. In other embodiments, surfactants such as Colloid 111M, manufactured by Colloid, Inc. in Newark, N.J., are used.

In certain embodiments of the present invention in which the mixture is a slurry, air bubbles were detected inside slurry droplets. Because it is believed that such entrapped bubbles cause undesirable dimples in the shaped, gelled bodies, the slurry should be de-aired prior to droplet-making under vacuum or by screening through a sieve of appropriate fineness, e.g., 100 mesh.

If the mixture is a suspension, it is important to choose the proper solids loading and viscosity, since these properties will affect not only the de-airing process, but also the packing density of the granular substance or precursor thereof in the shaped, gelled bodies and the smoothness of the surface of the shaped, gelled bodies. In preferred embodiments of the present invention, a granular substance is used and the solids loading is between about 25 v/o and about 30 v/o, while the viscosity is between about 30 cp and about 60 cp.

In preferred embodiments of the invention, green spheres are made and have a diameter of about 3 mm and a density of at east about 50% of theoretical density. The size and density of the spheres can be easily adjusted by varying either the mixture temperature, the solids loading, the nature of the first fluid, the concentration of the gelation compound, the nature of surfactants added to the slurry, or the size of the introduced portions.

When the formation of a ceramic sphere is desired, it is contemplated that sintering aids will be used in accordance with the present invention. In preferred embodiments of the present invention, such aids assist in the sintering of the ceramic and do not react deleteriously with any of the other compounds present in the process. However, in specific embodiments using a slurry comprising $Si_3N_4$, oxide sintering aids (e.g., MgO, $Y_2O_3$, and rare earth oxides) and agarose, the chemical nature of the sintering aid in the slurry (whether present as oxide, hydroxide, or oxalate), will likely affect gelation and sphere formation due to the different types of bonds that can be established with the macromolecules of the gelation compound. However, mere routine testing of the slurries will determine the suitability of given combinations for use in the present invention.

In preferred embodiments of the present invention, there is provided an aqueous slurry comprising ceramic powder and agarose, stabilized against sedimentation by colloid 111M, having a solids loading of about 25 v/o and a viscosity of 40 cp, to which is added a solution of agarose. The ceramic-water-agarose slurry, which is maintained at a suitable temperature above the gelation temperature of the gelation compound, is then added drop-wise into a cold water-immiscible liquid, such as oil. The droplets form spheres upon contact with the cold oil and subsequently gel. The solid spheres so obtained are removed from the oil and washed with 2-ethylhexanol, thereby extracting water from and densifying the spheres. The 2-ethylhexanol is then evaporated, thus leaving dry, densified spheres.

After calcination at an appropriate temperature to remove the gelation compound, pre-sintering densification of the dry spheres is optionally obtained by cold isostatic pressing (CIP) of the spheres in a powder bed. The densified, dewatered, spherical green body may then be subjected to sintering via processes such as hot glass isostatic pressing ("glass hipping"). Typically, the sintered bodies exhibit densities which are at least 99% of theoretical density, preferably at least about 99.5%. The sintered product is useful in ceramic bearings and as milling media for the production of submicron $Si_3N_4$ powders of high purity.

EXAMPLE 1

An aqueous suspension containing between about 20 and 30 w/o of silicon nitride powder, specifically NCX-5102 (having 4 w/o $Y_2O_3$) powder, manufactured by the Norton Company in Worcester, Mass., was prepared. Agarose was added to this suspension to produce in a final agarose concentration of about 2 w/o of the silicon nitride powder. The resulting slurry was then heated to about 50° C. and stirred as its pH was adjusted to about 9. Next, the suspension was de-aired in a vacuum of about 20 mm Hg for about 5–10 minutes. The suspension was then added drop-wise into an 18 inch high bath of paraffin oil maintained at about 0° C., almost immediately forming spheres. The spheres were allowed to cool for about 5 minutes prior to removal from the paraffin oil bath. After removal, the spheres were soaked in 2-ethyl hexanol for several hours, and then air dried for about a day to remove the 2-ethyl hexanol. Soaking the balls in 2-ethyl hexanol resulted in the dewatering of the spheres and an increase in the density of the spheres from about 25 volume percent (v/o) to about 50 volume percent.

Spherical ball bearings in the size range 1–3 mm were produced. Although small dimples were seen on the surface of the balls, these dimples were expected as they are caused by the air bubbles in the slurry and the slurry was not de-aired prior to casting. The gelled balls measured an average density of 2.1 gm/cc with a range between 1.86 to 2.23 gm/cc (67.7% T.D.), and ranged in diameter from 2.29 to 2.41 mm.

A few balls were sliced to examine their internal microstructure. These balls seemed to be solid and completely filled (not hollow in the center). Also they appeared to have a substantial absence of radial density gradients.

EXAMPLE 2

Drip casting experiments were performed as in Example 1, except that the slurry was de-aired in vacuum (20 mm of Hg), a minute amount of defoamer was used to further reduce the trapped bubbles in the suspension and prior to casting, both NCX-5102 and NBD-200, a silicon nitride powder having 1 w/o MgO, manufactured by Norton Company in Worcester, Mass., were used as powders, and the drops were added via a pipette having volume-control. The NBD-200 powder was milled for 48 hours to break down the majority of its agglomerates. Using these slurries, balls were successfully cast, as the dimples were substantially eliminated from the surfaces of these balls. Thus, it is believed that the source of the dimples in Example 1 was entrapped air bubbles in the slip. Further, it is recommended that powders such as the NBD-200 powder should be properly milled to remove all agglomerates. The green spheres made from NBD-200 were further examined for sphericity and uniformity of size by measuring each sphere across at least two orthogonal diameters.

Before reviewing the results of the examination, it is helpful to introduce the terminology used in the analysis. Respecting uniformity, the sum of the diameters of a given sphere divided by the number of diameters measured on that given sphere is termed the "mean sphere diameter". The "mean batch diameter" was then calculated by summing the mean sphere diameters for each sphere in the batch and dividing by the number of spheres in the batch. The ratio of the mean sphere diameter to the mean batch diameter, termed the "uniformity index" was calculated for each sphere.

Respecting sphericity, the difference between the largest and smallest diameter recorded for a given sphere, termed the sphere's "absolute sphericity" was calculated Next, the ratio of the absolute sphericity of a sphere to the mean batch diameter, termed the "relative sphericity" was calculated Table 1 below describes the drip casting results.

TABLE 1

DRIP CAST (NBD 200) SILICON NITRIDE BALLS AFTER DRYING

| BALL # | DIAMETER (MM) 0° (mm) | DIAMETER (MM) 90° (mm) | MEAN SPHERE DIAMETER | WEIGHT (g) |
|---|---|---|---|---|
| 1 | 2.46 | 2.35 | 2.405 | .012 |
| 2 | 2.39 | 2.42 | 2.405 | .012 |
| 3 | 2.40 | 2.38 | 2.390 | .011 |
| 4 | 2.46 | 2.49 | 2.475 | .014 |
| 5 | 2.37 | 2.43 | 2.400 | .012 |
| 6 | 2.48 | 2.47 | 2.475 | .013 |
| 7 | 2.36 | 2.37 | 2.365 | .012 |
| 8 | 2.42 | 2.49 | 2.455 | .013 |
| 9 | 2.38 | 2.40 | 2.390 | .013 |
| 10 | 2.40 | 2.44 | 2.420 | .013 |

The mean batch diameter of the green spheres was measured to be about 2.418 mm, with a standard deviation of about 0.038 mm. Three standard deviations from the mean batch diameter, representing the variance within which about 99.5% of the spheres would fall, was about 0.114 mm. Uniformity indices ranged from about 0.98 to about 1.02. Absolute spherocities ranged from about 0.01 mm to about 0.11 mm, while relative spherocities ranged from about 0.004 to about 0.045. Measured green densities exceeded 50% of theoretical density in each case.

Finally, the green spheres were hipped at 1840° C. and 30,000 psi for 1 hour. The resulting ceramics exhibited densities greater than 99% of the theoretical density. These ceramics were also examined for size uniformity and spherocity. Table 2 reports three diameter measurements for each ceramic ball as well as their weights and densities.

TABLE 2

| # SAMPLE | D1 (in.) | D2 (in.) | D3 (in.) | D AVG (in.) | WT (gm.) | DENSITY (gm./cc.) |
| --- | --- | --- | --- | --- | --- | --- |
| 1 | 0.0692 | 0.0737 | 0.0724 | 0.0718 | 0.0109 | 3.436 |
| 2 | 0.0658 | 0.0682 | 0.0678 | 0.0673 | 0.0084 | 3.216 |
| 3 | 0.0765 | 0.0814 | 0.0766 | 0.0782 | 0.0137 | 3.343 |
| 4 | 0.0678 | 0.0656 | 0.0701 | 0.0678 | 0.0086 | 3.211 |
| 5 | 0.0738 | 0.0722 | 0.0723 | 0.0728 | 0.0107 | 3.236 |
| 6 | 0.0718 | 0.0733 | 0.0740 | 0.0730 | 0.0101 | 3.021 |
| 7 | 0.0698 | 0.0702 | 0.0750 | 0.0717 | 0.0107 | 3.387 |
| 8 | 0.0681 | 0.0719 | 0.0703 | 0.0701 | 0.0092 | 3.112 |
| 9 | 0.0744 | 0.0771 | 0.0774 | 0.0763 | 0.0117 | 3.069 |
| 10 | 0.0688 | 0.0734 | 0.0732 | 0.0718 | 0.0102 | 3.211 |
| 11 | 0.0786 | 0.0777 | 0.0767 | 0.0777 | 0.0135 | 3.358 |
| 12 | 0.0720 | 0.0735 | 0.0767 | 0.0741 | 0.0109 | 3.126 |
| 13 | 0.0737 | 0.0738 | 0.0797 | 0.0757 | 0.0124 | 3.326 |
| 14 | 0.0803 | 0.0782 | 0.0800 | 0.0795 | 0.0129 | 2.992 |
| 15 | 0.0720 | 0.0717 | 0.0756 | 0.0731 | 0.0110 | 3.281 |
| 16 | 0.0744 | 0.0736 | 0.0742 | 0.0741 | 0.0111 | 3.183 |
| 17 | 0.0689 | 0.0701 | 0.0719 | 0.0703 | 0.0092 | 3.086 |
| 18 | 0.0729 | 0.0774 | 0.0741 | 0.0748 | 0.0112 | 3.118 |
| 19 | 0.0720 | 0.0750 | 0.0730 | 0.0733 | 0.0107 | 3.162 |
| 20 | 0.0700 | 0.0717 | 0.0727 | 0.0715 | 0.0099 | 3.160 |
| 21 | 0.0734 | 0.0749 | 0.0716 | 0.0733 | 0.0107 | 3.166 |
| 22 | 0.0679 | 0.0726 | 0.0730 | 0.0712 | 0.0095 | 3.071 |
| 23 | 0.0711 | 0.0716 | 0.0731 | 0.0719 | 0.0103 | 3.225 |
| 24 | 0.0715 | 0.0709 | 0.0730 | 0.0718 | 0.0101 | 3.180 |
| 25 | 0.0757 | 0.0745 | 0.0736 | 0.0746 | 0.0108 | 3.031 |
| 26 | 0.0691 | 0.0729 | 0.0702 | 0.0707 | 0.0100 | 3.293 |
| 27 | 0.0718 | 0.0723 | 0.0705 | 0.0715 | 0.0093 | 2.961 |
| 28 | 0.0734 | 0.0755 | 0.0734 | 0.0741 | 0.0107 | 3.064 |
| 29 | 0.0750 | 0.0730 | 0.0704 | 0.0728 | 0.0107 | 3.232 |
| 30 | 0.0767 | 0.0774 | 0.0782 | 0.0774 | 0.0129 | 3.238 |
| AVERAGE VALUE | | | | 0.0731 | 0.0107 | 3.1831 |
| 3 SIGMA | | | | 0.0084 | 0.0039 | 0.3527 |

The mean batch diameter of the green spheres was measured to be about 0.0731 in. with a standard deviation of about 0.0028 in. Three standard deviations from the mean batch diameter, representing the variance within which about 99.5% of the spheres would fall, was about 0.0084 in. Uniformity indices ranged from about 0.92 to about 1.08, with 85% of the samples having a uniformity index between about 0.96 and about 1.05. Absolute spherocities ranged from about 0.0008 in. to about 0.0060 in., with 90% of the samples having an absolute spherocity of less than about 0.0049 in. Relative spherocities ranged from about 0.01 to about 0.08, with 90% of the samples having a relative spherocity of less than about 0.07.

EXAMPLE 3

Casting was performed exactly as in Example 1, except that YZ-110, a zirconia having 4.6 w/o yttria, manufactured by Norton Company in Worcester, Mass., replaced silicon nitride as the powder. About 200 balls were successfully cast. Their average diameter was 2.0535 mm with a standard deviation of 0.0321 mm. Their weight was 0.0136 g having a standard deviation of 0.0007 g. Their average green density was 2.998 g/cc, representing a theoretical density of about 52%.

The green spheres were sintered at 600° C. for 1 hour in air at one atmosphere. Their average diameter was 1.587 nun with a standard deviation of 0.156 mm. Their average weight was 0.119 g with a standard deviation of 0.005 g. Their average green density was 5.79 g/cc, or greater than 96.5% of theoretical density. Finally the sintered spheres were hipped at 1500° C. and 30,000 psi for one hour. Their average diameter was 1.54 mm with a standard deviation of 0.025 mm. Their average weight was 0.0121 g with a standard deviation of 0.0002 g. Their average density was 5.965 g/cc, or greater than 99.5% of the theoretical density.

I claim:

1. A green body having a density of at least 50% of theoretical density, wherein the green body is in the shape of a sphere and comprises silicon nitride.

2. The green body of claim 1, wherein the density is at least about 65% of theoretical density.

3. The green body of claim 2, wherein the density is at least about 70% of theoretical density.

4. The green body of claim 1 consisting essentially of silicon nitride.

5. The green body of claim 4 having a substantial absence of radial density gradients.

6. The green body of claim 4 having a diameter of between 1 mm and 3 mm.

7. The green body of claim 5 having a density of at least about 65% of theoretical density.

8. The green body of claim 5 having a density of at least about 70% of theoretical density.

* * * * *